(12) United States Patent
Holzmann et al.

(10) Patent No.: US 11,583,790 B2
(45) Date of Patent: *Feb. 21, 2023

(54) FILTER WITH ELECTRICAL SIGNATURE ANTI-COUNTERFEITING FEATURE

(71) Applicant: CUMMINS FILTRATION IP, INC., Columbus, IN (US)

(72) Inventors: Mark V. Holzmann, Stoughton, WI (US); J. Bruce Schelkopf, Zionsville, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/205,655

(22) Filed: Mar. 18, 2021

(65) Prior Publication Data

US 2021/0205737 A1 Jul. 8, 2021

Related U.S. Application Data

(60) Continuation of application No. 16/451,279, filed on Jun. 25, 2019, now Pat. No. 10,967,304, which is a
(Continued)

(51) Int. Cl.
*B01D 29/11* (2006.01)
*B01D 46/24* (2006.01)
(Continued)

(52) U.S. Cl.
CPC ............ *B01D 29/111* (2013.01); *B01D 29/21* (2013.01); *B01D 46/009* (2013.01);
(Continued)

(58) Field of Classification Search
CPC ....... B01D 29/111; B01D 29/21; B01D 29/11; B01D 46/009; B01D 46/2414;
(Continued)

(56) References Cited

U.S. PATENT DOCUMENTS 3,778,531 A  12/1973 Higgins
4,686,515 A  8/1987 Anderson et al.
(Continued)

FOREIGN PATENT DOCUMENTS

CN        1439520 A      9/2003
DE   11 2011 100 851 T5   1/2013
WO   WO-2005/113112 A1  12/2005

OTHER PUBLICATIONS

First Office Action for Chinese Patent App. No. 201280034772.6, dated Nov. 4, 2015, 35 pages (with translation).
(Continued)

*Primary Examiner* — Akash K Varma
(74) *Attorney, Agent, or Firm* — Foley & Lardner LLP

(57) ABSTRACT

An anti-counterfeiting mechanism for a filter element to specifically, and preferably uniquely, identify a filter with a conductive pattern or path of conductive materials preferably either embedded (thin film circuit) under the surface, or over molded on, a portion of the filter. The conductive materials are preferably positioned at the filter end cap. The resistance of the filter element is an identifier that is preferably associated with the OEM manufacturer's labeling (such as product number) and/or other branding of the component. This electrical resistance signature permits rapid identification of counterfeit filters.

19 Claims, 3 Drawing Sheets

Related U.S. Application Data division of application No. 13/544,164, filed on Jul. 9, 2012, now Pat. No. 10,441,903.

(60) Provisional application No. 61/508,635, filed on Jul. 16, 2011.

(51) Int. Cl.
*B01D 46/00* (2022.01)
*B01D 29/21* (2006.01)

(52) U.S. Cl.
CPC .... *B01D 46/2414* (2013.01); *B01D 2201/291* (2013.01); *B01D 2201/52* (2013.01)

(58) Field of Classification Search
CPC .. B01D 46/24; B01D 46/00; B01D 2201/291; B01D 2201/52; B01D 35/00; B01D 35/14; B01D 35/143; C02F 2201/00; C02F 2201/03; B60Q 1/44; B60Q 5/005; G03G 15/00; G06K 7/06; G06K 7/08; G06K 7/10
USPC ............... 210/85, 90, 91, 243; 399/12, 252; 55/502; 235/441, 444, 462
See application file for complete search history.

(56) References Cited

U.S. PATENT DOCUMENTS

| | | | |
|---|---|---|---|
| 5,432,322 A | 7/1995 | Ingram et al. | |
| 5,602,042 A | 2/1997 | Farber | |
| 5,974,150 A | 10/1999 | Kaish et al. | |
| 6,875,105 B1 | 4/2005 | Behm et al. | |
| 7,128,835 B1 | 10/2006 | Hundley et al. | |
| 7,512,795 B2 | 3/2009 | Buskey et al. | |
| 7,720,254 B2 | 5/2010 | Stierman et al. | |
| 7,757,952 B2 | 7/2010 | Tuschel et al. | |
| 7,773,749 B1 | 8/2010 | Durst et al. | |
| 8,108,309 B2 | 1/2012 | Tan | |
| 2002/0144938 A1* | 10/2002 | Hawkins | B01D 35/143 210/243 |
| 2003/0042306 A1 | 3/2003 | Irwin et al. | |
| 2003/0052936 A1 | 3/2003 | Kosugi | |
| 2005/0044830 A1* | 3/2005 | Dworatzek | F02M 35/024 55/502 |
| 2006/0098993 A1 | 5/2006 | Yang | |
| 2008/0000960 A1 | 1/2008 | Outwater et al. | |
| 2009/0162625 A1 | 6/2009 | Takeuchi et al. | |
| 2010/0066502 A1 | 3/2010 | Giraud et al. | |
| 2010/0179914 A1 | 7/2010 | Levin et al. | |
| 2011/0048772 A1 | 3/2011 | Han | |
| 2011/0059233 A1 | 3/2011 | Liu et al. | |
| 2011/0091066 A1 | 4/2011 | Alattar | |
| 2012/0186691 A1 | 7/2012 | Bridges et al. | |
| 2014/0144819 A1 | 5/2014 | Verdegan et al. | |

OTHER PUBLICATIONS

First Office Action for German Patent App. No. 112012002607.1, dated Apr. 2, 2019, 6 pages (German only).
First Office Action for Indian Patent App. No. 445/CHENP/2014, dated Feb. 15, 2018, 5 pages.
International Preliminary Report on Patentability for International App. No. PCT/US2012/046942, dated Jan. 30, 2014, 11 pages.

* cited by examiner

FILTER WITH ELECTRICAL SIGNATURE ANTI-COUNTERFEITING FEATURE

CROSS REFERENCE TO RELATED APPLICATIONS

This application is a continuation of U.S. patent application Ser. No. 16/451,279, filed Jun. 25, 2019, which is a divisional of U.S. patent application Ser. No. 13/544,164, filed Jul. 9, 2012, now U.S. Pat. No. 10,441,903, which claims priority to U.S. Provisional Patent Application No. 61/508,635 filed Jul. 16, 2011, the disclosures of which are expressly incorporated by reference herein.

BACKGROUND OF THE INVENTION

Protection of branded products is more difficult with the increasing flow of goods across borders. The globalization of the economy results in greater challenges to protect the value associated with innovation, as well as goodwill in a company's brand or brands. Even if trademark laws and/or branding rights are respected in all countries in which an Original Equipment Manufacturer (OEM) does business, falsely labeled goods continue to detrimentally impact upon an OEM's business and profitability.

Cummins Filtration is in the business of producing filter products, some of which are used with, for example, diesel engines manufactured by a sister company. One problem is counterfeit manufacturers produce reverse engineered products identified as Cummins Filtration products, even though such products are inferior in many respects, and fail to meet necessary performance requirements. This type of activity significantly erodes an OEM's business over the product life cycle, particularly when inferior products can cause premature engine failure.

It is important to catch "copycats" in the act to discourage the counterfeiting industry as a whole, as well as reduce warranty costs if engines are failing prematurely in their product life cycle due to use of inferior counterfeit products. However, since the outer facade and packaging of the OEM filter product are often illicitly replicated, a reliable way of discerning whether a product is counterfeit is needed. Identification of OEM products has been previously accomplished using, for example, RFID tags as well as custom plastic formulations that may be molded into the OEM article. However, due to the illicit replication of the external facade and/or the RFID tag, further efforts are needed to reduce or halt illegal counterfeiting activities. Extensive efforts made by counterfeiters have been noted (how the counterfeit goods are made, type of shipping containers, etc.) in past efforts to police illegal counterfeit products in the marketplace. These efforts demonstrate that illicitly copying OEM products, packaging, and/or branding may pose a significant challenge to one's business if not stopped quickly. Often, raids must be performed on companies producing the counterfeit products, and such raids need to include a rapid demonstration of the false packaging and branding of the products located in such raids. Further improvements are needed in anti-counterfeiting measures to protect value.

SUMMARY OF THE INVENTION

In one embodiment of the invention there is an anti-counterfeiting mechanism for a filter element to specifically, and preferably uniquely, identify a filter element with a nano-coating of conductive materials either embedded (thin film circuit) under the surface, or over molded or sprayed or otherwise positioned on, a portion of the filter element. The electrical resistance signature of the filter element is an identifier that is preferably associated with the OEM manufacturer's labeling (such as product number) and/or other branding of the component. This specific (and preferably unique) electrical resistance signature permits more straight-forward identification of counterfeit filters as such will lack the pre-determined "resistance" identifier that demonstrates it is an OEM part.

In one refinement the conductive materials are positioned at least partially on the filter end cap.

In another refinement, the anti-counterfeiting potential of the "resistance" might be secretly changed based on production timeframes to keep copycats and counterfeiters in a permanent chase of the OEM's methods of manufacturing.

In another refinement, the anti-counterfeiting potential of the "resistance" might be increased by having more than one "resistance" identifier on a single product. The identifiers might have the same resistance, or have different resistances.

In another refinement, the location of the resistance element on the filter element might be changed.

In another refinement the filter includes a diaphragm and a strain gauge measuring changes to the diaphragm as the filter becomes plugged.

In another refinement the filter includes a diaphragm and at least one conductive path traverses at least a portion of the diaphragm such that the conductivity is altered by movement in the diaphragm as the filter becomes plugged.

In another embodiment of the invention there is a filter element end cap. The filter element end cap has a predetermined electrical resistance signature. The signature results from a thin film circuit formed on a polymer substrate of the end cap.

In one refinement the thin film circuit of the end cap might be formed by applying nanoparticles on the polymer substrate. The nanoparticles might be selected from the group consisting of copper, silver and gold.

In another refinement the thin film circuit of the end cap aright be formed by applying nanoparticles on the polymer substrate. The nanoparticles might be selected from the group consisting of CNTs, mCNTs, and nano-graphene platelets.

In another refinement the thin film circuit of the end cap might result from injection overmolding of the thin film circuit having an embedded resistive path into the end cap.

In another refinement the end cap might include at least two terminals protruding from the end cap.

In another refinement the thin film circuit of the end cap might result from injection overmolding a copper wire into the end cap.

In another refinement the end cap includes at least two terminals protruding from the end cap, whereby the copper wire might be electrically connected to the terminals.

In another refinement the thin film circuit of the end cap comprises an external coating, including a plurality of conductive nanoparticles applied to an exterior surface of the end cap.

In another refinement the coating of the end cap improves the conductivity of the end cap just above the conductivity of the polymer substrate.

In another refinement the conductivity of the end cap is improved by less than ten (10) percent.

In another refinement the exterior surface of the end cap includes at least two spaced apart positions at which resistance may be measured.

In another refinement the electrical resistance signature is a first electrical resistance signature measured at a first position and a second position spaced apart from the first position. The filter includes a second electrical resistance signature measured at a third position and a fourth position and at least one of the third position and the fourth position is different from the first position and the second position. The second electrical resistance signature preferably being different than the first electrical resistance signature.

In another refinement the electrical resistance signature of the end cap might be associated with a regional location within a country.

In another refinement the end cap includes a diaphragm and a strain gauge measuring changes to the diaphragm as the filter becomes plugged.

In another refinement the end cap includes a diaphragm and at least one conductive path traverses at least a portion of the diaphragm such that the conductivity is altered by movement in the diaphragm as the filter becomes plugged.

In another embodiment of the invention there is a replaceable filter element. The replaceable filter element has a pre-determined externally measurable electrical resistance signature of a circuit that includes a conductive path. The conductive path extends along at least a portion of the filter element.

In one refinement the circuit of the replaceable filter element is located on an end cap.

In another refinement the circuit of the replaceable filter element is a thin film circuit formed by applying nanoparticles onto a polymer substrate of the end cap.

In another refinement the replaceable filter element includes at least two terminals protruding from the end cap. The thin film circuit results from injection overmolding a copper wire into the end cap. The copper wire is electrically connected to the terminals.

In another refinement the circuit of the replaceable filter element is a thin film circuit comprising an external coating including a plurality of conductive nanoparticles applied to an exterior surface of the end cap.

In another refinement at least a portion of the conductive path of the replaceable filter traces along the filtration media.

In another refinement at least a portion of the conductive path of the replaceable filter element is embedded within the filtration media.

In another refinement another portion of the conductive path of the replaceable filter element traces along at least part of an end cap of the filter element.

In another refinement the electrical resistance signature is a first electrical resistance signature measured at a first position and a second position spaced apart from the first position. The filter includes a second electrical resistance signature measured at a third position and a fourth position and at least one of the third position and the fourth position is different from the first position and the second position. The second electrical resistance signature preferably being different than the first electrical resistance signature.

In another embodiment of the invention there is a filter element. The filter element has an anti-counterfeit mechanism. The anti-counterfeit mechanism includes an electrical resistance signature formed at least in part by a conductive pattern positioned next to a polymer portion of the filter element.

In one refinement the polymer portion of the filter element is over molded to cover at least a portion of a thin film circuit formed by the conductive pattern. The polymer portion of the filter element further comprises at least two terminals protruding therefrom. The terminals are electrically connected to the thin film circuit.

In another refinement the filter element may be combined with a filter head, whereby the filter head includes at least one sensor positioned to electrically connect to the terminals.

In another refinement at least one sensor of the filter element and filter head are electrically connected to an ECM. The ECM is programmed to preclude operation of a corresponding engine unless the conductivity measured substantially matches that in a pre-existing database stored in the ECM.

In another refinement the conductive pattern of the filter element comprises a nanoparticle coating on an exterior surface of the filter element. The coating increases the conductivity above the conductivity of the polymer portion by a pre-determined amount.

In another refinement the filter element may be combined with a filter head. The filter head includes at least one sensor positioned to electrically connect to a plurality of positions of the coating to measure the electrical resistance signature.

In another refinement the conductive pattern of the filter element is positioned at least partially within the polymer portion of the filter element.

In another refinement the polymer portion of the filter element is a first polymer portion. The conductive pattern is a second polymer portion. The second polymer portion is a conductive polymeric compound having a different conductivity than the first polymer portion.

In another refinement at least a part of the second polymer portion of the filter element defines a curved shape. The second polymer portion extends continuously from a first measurement position to a second measurement position.

In another refinement the filter element may combine with a filter head. The filter head includes at least one sensor positioned to take electrically connect to the first measurement position and the second measurement position.

In another refinement the electrical resistance signature is a first electrical resistance signature measured at a first position and a second position spaced apart from the first position. The filter includes a second electrical resistance signature measured at a third position and a fourth position and at least one of the third position and the fourth position is different from the first position and the second position. The second electrical resistance signature preferably being different than the first electrical resistance signature.

In another refinement the end cap includes a diaphragm and a strain gauge measuring changes to the diaphragm as the filter becomes plugged.

In another refinement the end cap includes a diaphragm and at least one conductive path traverses at least a portion of the diaphragm such that the conductivity is altered by movement in the diaphragm as the filter becomes plugged.

In another embodiment of the invention there is a method of identifying counterfeit filters. The method of identifying counterfeit filters comprises measuring the electrical resistance signature on a filter being tested. The measured electrical resistance signature is compared to a database of electrical resistance signatures corresponding to a plurality of OEM filters to determine whether the filter being tested is counterfeit.

In one refinement the method of identifying counterfeit filters further comprises updating the database to remove an electrical resistance signature associated with one of the plurality of OEM filters that is no longer being produced with that electrical resistance signature.

In another refinement the method of identifying counterfeit filters further comprises updating the database to add at least one new electrical resistance signature for a newly released OEM filter.

In another refinement the method of identifying counterfeit filters further comprises updating the database when the electrical resistance signature for at least one OEM filter is changed.

In another embodiment of the invention there is a method of identifying counterfeits when testing engine filter elements for use with an internal combustion engine. A database of a plurality of electrical signatures is created. Each electrical signature is associated with a corresponding OEM engine filter element. The database is installed onto an engine control module (ECM). The electrical signature on the engine filter element being tested is measured using at least one sensor that is electrically connected to the ECM. Additionally, the at least one sensor compares the measured electrical signature to the database installed on the ECM to determine if the engine filter element being tested is counterfeit.

In one refinement the database of electrical signatures of the method of identifying counterfeits is a database of electrical resistance signatures.

In another refinement the method of identifying counterfeits further comprises updating the database to remove an electrical signature associated with the OEM filter element that is no longer being produced with that electrical signature.

In another refinement the method of identifying counterfeits further comprises updating the database to add at least one new electrical signature for a newly released OEM filter element.

In another refinement the method of identifying counterfeits further comprises updating the database when the electrical signature for at least one OEM filter element is changed.

In another refinement the method of identifying counterfeits further comprises causing the ECM to de-rate the operating performance of a corresponding internal combustion engine if the filter element is determined to be counterfeit.

In another refinement the method of identifying counterfeits further comprises electrically connecting the sensor to at least two terminals on the filter element being tested.

In another embodiment there is a method of reducing counterfeiting of an engine filter. The method comprises manufacturing in a first period of time an engine filter with a first electrical resistance signature as measured from a first measuring position and a second measuring position. The method further comprises manufacturing in a second period of time the engine filter with a second electrical resistance signature as measured from a third measuring position and a fourth measuring position. The first electrical resistance signature is different from the second electrical resistance signature.

In one refinement the third measuring position is the same as the first measuring position and the fourth measuring position is the same as the second measuring position.

In another refinement the first electrical resistance signature is that resulting from a first conductive path and the second electrical resistance signature is that resulting from a second conductive path.

In another refinement each conductive path is formed by a plurality of nanoparticles on an at least partially plastic substrate.

In another refinement each conductive path is formed by a coating of nanoparticles.

In another refinement at least one of the conductive paths has the nanoparticles embedded under a surface of the engine filter.

In another refinement at least one of the conductive paths has the nanoparticles overmolded in an end cap of the engine filter.

In another refinement at least one of the conductive paths traces at least a portion of an external surface of a filtration media of the engine filter.

In another refinement the second electrical resistance signature is varied from the first electrical resistance by altering one or more of the features of a conductive path on the engine filter selected from the following group: a length of the conductive path, a thickness of a nanoparticle media used to form the conductive path, a width of the conductive path, a pattern traced by the conductive path, a substrate upon which the conductive path sits, a material of a nanoparticle media used to form the conductive path.

In another embodiment there is a method of servicing an engine and denying a warranty claim for engine failure based on identification of filter as counterfeit because it lacks the proper electrical resistance signature when compared to a pre-existing database of electrical resistance signatures for the filter.

DETAILED DESCRIPTION OF THE PREFERRED EMBODIMENTS

Figure 1:
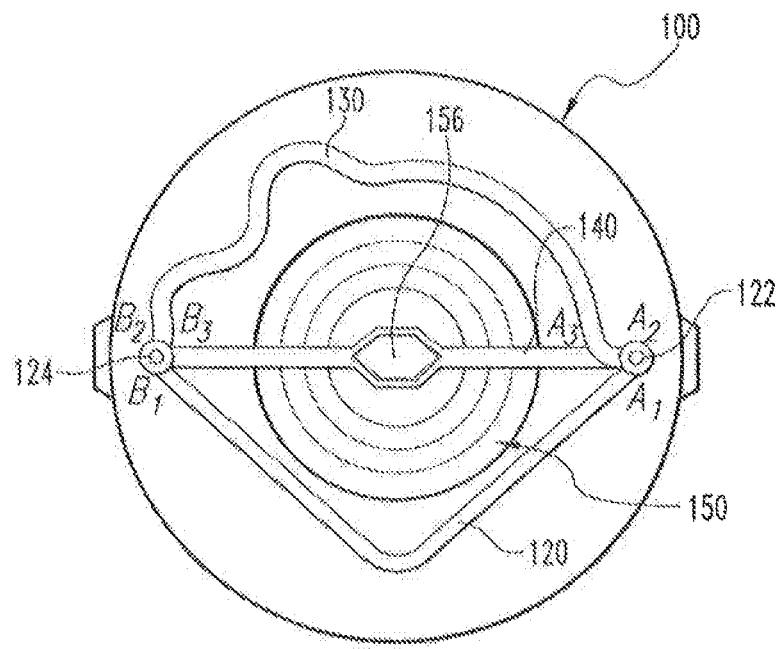
FIG. 1 is an end view of one embodiment of an electrical resistance signature based anti-counterfeiting mechanism on, for example, an end cap of a filter element.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
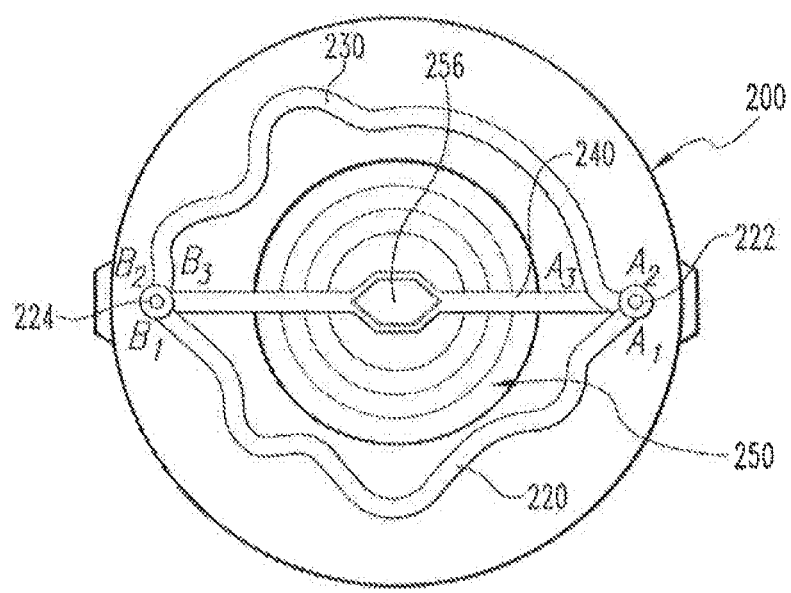
FIG. 2 is an end view of another embodiment of an electrical resistance signature based anti-counterfeiting mechanism on, for example, an end cap of a filter element.

Referring to FIG. 1 and FIG. 2, these figures generally illustrate various aspects of the present invention. It will be understood that some features illustrated in these figures might be distant from the core notion of an anti-counterfeiting feature of a conductive path or pattern having a known electrical signature. More specifically, these figures illustrate the possible inclusion of a diaphragm (whether integral or attached) at the end cap. The conductive path extending over the diaphragm does go to detecting whether a filter is counterfeit. However, the diaphragm might include a strain gauge integrated therein. Thus, as the filter becomes plugged, the pressure within the filter is reduced. Consequently, the diaphragm bulges inward due to the lower pressure inside the filter. This bulging may be sensed either due to a change in the conductive pattern or via another sensor, acting as an end-of-filter life measurement.

With reference to FIG. 1 there is illustrated a first embodiment of a filter end cap 100 with an anticounterfeit mechanism. Filter end cap 100 includes a first circuit 120 that traces from a common starting position 122 to a common end position 124. Filter end cap 100 includes a second circuit 130 that traces from a common starting position 122 to a common end position 124. Filter end cap 100 includes a third circuit 140 that traces from a common starting position 122 to a common end position 124. The third circuit 140 also traces over a rolling diaphragm 150 and a substantially centrally positioned micro-strain gauge 156. Example resistances for the conductive paths are included in Table 1, it being understood that such resistances are merely exemplary and that other resistances are contemplated as within the scope of the invention.

TABLE 1

| Number | Circuit | Resistance (in ohms) |
| --- | --- | --- |
| 1 | $A_1$-$B_1$ | 200 Ω |
| 2 | $A_2$-$B_2$ | 280 Ω |
| 3 | $A_3$-$B_3$ | 160 Ω |

With reference to FIG. 2 there is illustrated another embodiment of a filter end cap 200 with an anticounterfeit mechanism. Filter end cap 200 includes a first circuit 220 that traces from a common starting position 222 to a common end position 224. Filter end cap 200 includes a second circuit 230 that traces from a common starting position 222 to a common end position 224. Filter end cap 200 includes a third circuit 240 that traces from a common starting position 222 to a common end position 224. The third circuit 240 also traces over a rolling diaphragm 250 and a substantially centrally positioned micro-strain gauge 256. One or more of the resistances for the conductive paths will vary from those previously included in Table 1 as would be the case when a manufacturer alters the resistances to defeat counterfeiter attempts to mimic the anti-counterfeiting mechanism as originally released. For example, as illustrated in FIG. 2, the second conductive path 220 traces a different path than the conductive path 120 of the embodiment of FIG. 1. Additionally, or alternatively, one or more of the conductive paths 220, 230 and 240 could be varied from the conductive paths 120, 130 and 140 in a different manner. For example, fewer or greater numbers of conductive paths might be present. As another example, the resistance of each conductive path could be varied by altering factors including, but not limited to, among others: 1) length of conductive path; 2) thickness of nano-conductive media; 3) width of patterned circuit; 4) substrate; 5) type of conductive nano-media.

The rolling diaphragm (150, 250) in FIGS. 1 and 2 is preferably a separate elastomeric feature located within the end cap that includes a conductive path, and possibly also includes a strain gauge (156, 256) that deflects based on restriction that causes a lower internal pressure of the filter. This diaphragm (150, 250) deflects based on the pressure differential between two sides and relates to the filter life based on the amount of particulate lodged in the filter media which relates to useful life remaining. The filter will experience over a cumulative time period a restriction threshold described by the "final restriction", which indicates a filter element is fully loaded and will need replacement. Once the plugged filter is replaced by a new filter, the cycle of sensing restriction with new filter life occurs until the changing internal restriction hits the threshold (filter plugged) all over again in time. This nature of "sensing resistance" of a new filter to plugged filter and any useful life of filter can be dependent on the electrical resistance signature. In one refinement this electrical resistance signature can be compared to lookup tables (remaining filer life vs. resistance) and predictive analysis could be used to send a signal to an instrument panel indicating the remaining filter life. In another refinement it might indicate that the filter should be changed when plugged and final restriction has been sensed. Each filter can have a set of programmed algorithms written and installed in the ECM (Engine Control Module) as special code that includes the respective tables of resistance data relating to filter life from clean (beginning of life cycle) to fully plugged (end of life cycle).

Further aspects of one or more embodiments of the present invention will now be described. The electrical signature is preferably an electrical resistance signature, though a flux signature (via use of magnetic materials, preferably including some rare earth magnets or combinations thereof) might also find use in some applications. In one embodiment, the electrical resistance signature is formed by applying conductive particles onto a substrate. In one refinement, the particles are preferably nano-particles of copper, silver, gold or Carbon NanoTubes (CNTs), mCNT's, or other conductive media including, but not limited to, nano-graphene platelets. The particles are applied onto a plastic substrate via a conductive pattern or conductive path having specific "resistance" details. The conductive pattern or conductive path is preferably via a closed circuit from one region of the OEM product to another region forming the length of the circuit. As will be discussed further below, in one preferred embodiment the product is a replaceable filter element. In one embodiment the circuit is preferably formed on a polymer end cap of the filter element for ease of access by a sensor. The resistance of the conductive pattern or path would be dependent on factors including, but not limited to, among others: 1) length of conductive path; 2) thickness of nano-conductive media; 3) width of patterned circuit; 4) substrate; 5) type of conductive nano-media. The pattern could be custom designed to identify each filter product line end cap by its associated electrical resistance signature. Additionally, the electrical resistance signature could be readily changed to keep counterfeiters off balance, and to negate attempts by counterfeiters to circumvent this anti-counterfeiting feature. That is to say, the product line is altered at preferably aperiodic dates with the release of the filter element having a different electrical resistance signature (either a different amount of resistance, or a resistance path at a different location, or both) as counterfeiters begin altering their products to include the first electrical resistance signature.

It should be understood that multiple methods of manufacturing products with a pre-determined electrical resistance signature are contemplated as within the scope of the invention. The methods discussed herein are merely exemplary, and are not intended to restrict the scope of the claims except as done by explicit limitations present in a claim.

One method of manufacturing is via injection molding. In one embodiment this might include injection overmolding of thin film circuitry (with nanoparticle embedded resistive path) into an end cap similar to "In Mold Labeling" molding techniques (wherein text and numerals representing the product label and/or brand are molded as part of the product or some portion of the product). In a refinement of this embodiment there might further be included terminals protruding from the product (such as an end cap of a filter element) that are electrically connected to the resistive path or pattern. These terminals can act as the sensor contacts or pickup points for measuring resistance.

Another method of manufacturing might include injection overmolding of, for example, a copper wire connected to terminals protruding from, for example, the end cap of the filter element. Again, these terminals can act as the sensor contacts or pickup points for measuring resistance.

Yet another method of manufacture might be considered an injection molding with post-mold "plasma dust" operation. In such method a controlled amount of "plasma dust" including nano-conductive coatings (copper, silver, gold, etc.) is applied to the exterior of the filter element end cap (or some other selected portion of the filter element). The applied materials improve the conductivity to an amount just above the conductivity of the base polymeric family (preferably by a specified low percentage, for example, less than 10%). In one refinement this permits regions of terminal pickup or sensor positions to be on the outer surface of the end cap. Thus, it will be understood that embodiments lacking protruding terminals are contemplated as within the scope of the invention.

As previously noted, in one embodiment the product is a replaceable filter element, and the circuit is formed on an end wall of a polymer end cap of the filter element for ease of access by a sensor. It should be understood that it is contemplated as within the scope of the invention that the resistive path need not be on the end wall of the polymer end cap of the filter element. For example, some portion or the entirety of the resistive path might be on a side wall of the end cap. As another example, the resistive path might be formed on a position or portion of the filter element other than the end cap. It should further be understood that it is considered within the scope of the invention that the resistive path could be present on the end cap alone, or might be on some combination of the end cap and the filter media as will be discussed with respect to FIG. 4. That is to say, the nanoparticles or other conductive media might also be sprayed or otherwise interspersed on or within the filter media to trace a conductive path or pattern along at least some portion of the filter media in addition to that present on the end cap, or instead of that present on the end cap. Additionally, the conductive path or pattern might further extend from the end cap through the filtration media itself and onward to the other end of the filter element.

Figure 3:
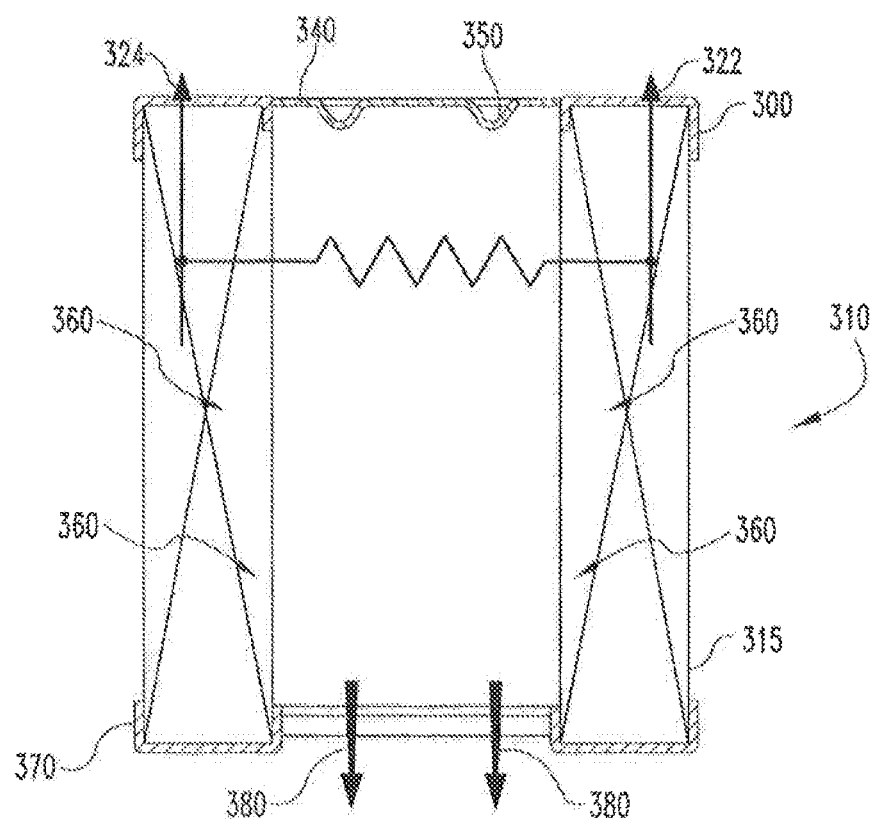
FIG. 3 is a side view of an embodiment of an anti-counterfeiting mechanism for a filter element.

With reference to FIG. 3 there are illustrated aspects of a replaceable filter element 310 having an anticounterfeit mechanism on filter inlet end cap 300. End cap 300 preferably includes a rolling diaphragm 350. End cap also includes at least a first conductive path 340 from starting position 322 (a first resistance pickup position) to ending position 324 (a second resistance pickup position) that traverses at least a portion of the diaphragm 350. Filter 310 also includes an outlet end cap 370. Fluid to be filtered flows through filtration media 315 as indicated by the arrows 360 and exits from the filter 310 as indicated by the arrows 380.

Figure 4:
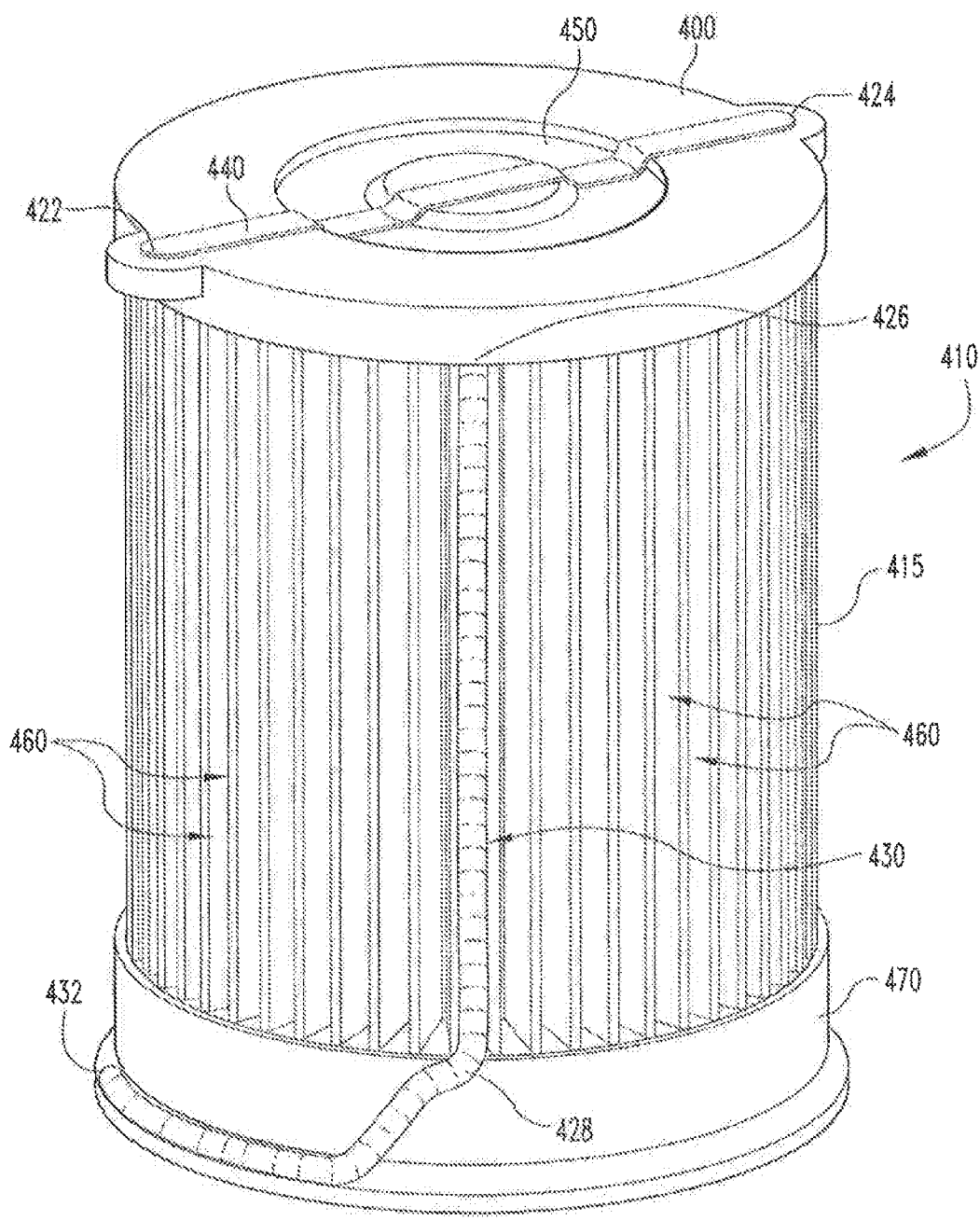
FIG. 4 is a side view of an embodiment of an electrical resistance signature that includes portions of a falter other than the end cap, in particular illustrating that the conductive path might also trace the length of the filter media.

With reference to FIG. 4 there are illustrated aspects of a replaceable filter element 410 having an anticounterfeit mechanism. Inlet end cap 400 preferably includes a rolling diaphragm 450. End cap also includes at least a first conductive path 440 from starting position 422 to ending position 424 that traverses at least a portion of the diaphragm 450. Filter 410 also includes an outlet end cap 470. Fluid to be filtered flows through filtration media 415 as indicated by the arrows 460 and exits from the filter 410 through the bottom of the outlet end cap 470. The replaceable filter element further includes a second conductive path 430 that traces a path from a starting position 426 on or adjacent to the inlet end cap 400. The second conductive path 430 extends the axial length of the filter element 410 along filtration media 415 to a second position 428 on or adjacent to the outlet end cap 470. As illustrated, there might also preferably be a conductive path extending along outlet end cap 470 from second position 428 to a third position 432.

It will further be understood that alternative refinements for creation of the resistance path or pattern are contemplated as within the scope of the invention. Previously described embodiments discussed application of nanoparticles within or a nanoparticle coating on a polymer substrate, as well as discussing a copper wire within the polymer. Alternative mechanisms for creating the conductive path or pattern are also within the scope of the invention such as almost any custom conductive media. As another example, in injection molding a first base polymer might be injected followed by a second conductive polymeric compound having a different conductivity than the first base polymer. The second conductive polymeric compound might be molded to have a squiggly shape, spiral shape, or otherwise formed to have a continuous path from a starting position or point A to an ending position or point B.

In the previously described refinement in which the conductive path or pattern is present solely on the end cap, the sensors that measure resistance and interface with the ECM will naturally also interface with the end cap. However, as other refinements have been disclosed in which the conductive path(s) or pattern(s) traces a portion of the filter element (see FIG. 3) in addition to, or instead of, the end cap, it will be understood that the sensors might instead interface with a position on the filter element other than the end cap. Additionally, it is understood that the electrical signature might be measured in some applications in a noncontact fashion, or via a combination of contact measurements and noncontact measurements.

As previously noted in one preferred application the product is a replaceable filter element. The use of one or more aspects of the present invention permit the creation of, for example, filter element end caps that are producible on a custom basis by changing the end cap design slightly with modifiable electrical resistance paths. Further ramifications of another application of the present invention might include creating a file specific to each filter product (or associated end cap if applicable) that is downloaded or otherwise provided as a database at some or preferably all authorized dealerships. As another potential application, such a file or database might be installed on an ECM of the internal combustion engine (such ECM preferably being programmed to implement a no-run condition if a genuine filter is absent). Additionally, globally such database (whether released to authorized dealerships or installed on ECMs) might also identify each filter by regional location within a country if needed. Moreover, applications of one or more aspects of the present invention might permit identifying filter elements anywhere in the field that have been copied from OEM technology, and catch counterfeiters on the spot.

As mentioned previously, preventing or minimizing counterfeit activity is often a necessary prerequisite to preserving value originating from innovation and/or branding. In the first instance it permits OEM manufacturers to maintain market exclusivity with those customers relying on the OEM brand in making purchasing decisions. Additionally, preventing counterfeiting further provides economic value such as, for example, reducing warranty costs from consumers using inferior filtration products on engines for which only OEM products are authorized under warranty conditions.

Additional refinements of the various embodiments are contemplated as within the scope of the invention. For example, standardization might be preferred in some applications such that multiple products could have the same level of predetermined resistance, as opposed to each product having a unique predetermined electrical resistance signature. Also, as previously mentioned, the position of the pickup region or contact points on the product might be varied to further impair counterfeiting attempts. Additionally, materials might be selected that are of varying resistance depending on the applied voltage, thus further obfuscating the design parameters being measured to defeat counterfeiters.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A filter element, comprising:
a filtration media; and
a first filter end cap coupled to a first end of the filtration media, the first filter end cap having a predetermined resistance signature resulting from a conductive path embedded in the first filter end cap or formed on a polymer substrate of the first filter end cap, the conductive path extending from a first location on a first side of a center of the first filter end cap to a second location on a second side of the center of the first filter end cap.

2. The filter element of claim 1, wherein the conductive path extends in a substantially straight line from the first location, across the center of the first filter end cap, and to the second location.

3. The filter element of claim 1, wherein the conductive path extends from the first location, around the center of the first filter end cap, to the second location.

4. The filter element of claim 1, wherein the first filter end cap comprises a rolling diaphragm therein, and wherein the conductive path extends across the rolling diaphragm.

5. The filter element of claim 1, wherein the predetermined resistance signature is a first predetermined resistance signature and the conductive path is a first conductive path, and wherein the first filter end cap further has a second predetermined resistance signature resulting from a second conductive path embedded in the first filter end cap or formed on the first filter end cap.

6. The filter element of claim 5, wherein the second conductive path extends from a third position to a fourth position, wherein at least one of the third position and the fourth position is different from the first position and the second position, and wherein the second predetermined resistance signature is different than the first predetermined resistance signature.

7. The filter element of claim 5, wherein the second conductive path extends from the first location to the second location.

8. The filter element of claim 5, wherein the first filter end cap further has a third predetermined resistance signature resulting from a third conductive path embedded in the first filter end cap or formed on the first filter end cap.

9. The filter element of claim 8, wherein the third conductive path extends from the first location to the second location.

10. The filter element of claim 8, wherein the second conductive path and the third conductive path extend from the first location to the second location.

11. The filter element of claim 8, wherein the first filter end cap comprises a rolling diaphragm therein, and wherein one of the first conductive path, the second conductive path, and the third conductive path extends across the rolling diaphragm.

12. The filter element of claim 8, wherein the first filter end cap comprises a strain gauge thereon, and wherein one of the first conductive path, the second conductive path, and the third conductive path extends across the strain gauge.

13. The filter element of claim 1, wherein the predetermined resistance signature is an electrical resistance signature.

14. The filter element of claim 1, wherein the predetermined resistance signature is a flux signature.

15. The filter element of claim 14, wherein the flux signature is provided via the use of magnetic particles.

16. The filter element of claim 15, wherein the magnetic particles comprise rare earth magnetic particles.

17. The filter element of claim 1, wherein the predetermined resistance signature is formed via applied conductive particles selected from the group consisting of copper, silver, gold, carbon nanotubes (CNTs), mCNT's, and nano-graphene platelets.

18. The filter element of claim 1, further comprising a second end cap coupled to a second end of the filtration media, wherein the predetermined resistance signature is a first predetermined resistance signature and the conductive path is a first conductive path, and wherein a second predetermined resistance signature is provided by a second conductive path, the second conductive path extending an axial length along the filtration media from a position on or adjacent the first filter end cap to a position on or adjacent the second end cap.

19. The filter element of claim 18, wherein at least a portion of the second conductive path extends circumferentially along at least a portion of the second end cap.

* * * * *